United States Patent
Müller

(10) Patent No.: US 6,438,375 B1
(45) Date of Patent: Aug. 20, 2002

(54) COORDINATING DIFFERENT TYPES OF MESSAGES SENT TO MOBILE RADIOS IN A MOBILE COMMUNICATIONS SYSTEM

(75) Inventor: Walter G. A. Müller, Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/262,346

(22) Filed: Mar. 4, 1999

(51) Int. Cl.[7] .................................................. H04Q 7/38
(52) U.S. Cl. ........................ 455/435; 455/343; 455/414; 340/7.33
(58) Field of Search ................................ 455/343, 410, 455/411, 414, 426, 434, 435, 574; 340/7.32, 7.33, 7.38, 7.41, 7.43, 7.48; 370/311, 342, 337, 347

(56) References Cited

U.S. PATENT DOCUMENTS

| | | | |
|---|---|---|---|
| 4,692,945 A | * 9/1987 | Zdunek | ........................ 455/17 |
| 5,404,355 A | 4/1995 | Raith | |
| 5,574,728 A | 11/1996 | Mamaghani et al. | |
| 5,596,315 A | 1/1997 | Olds et al. | |
| 5,673,259 A | * 9/1997 | Quick, Jr. | .................... 370/342 |
| 5,697,097 A | * 12/1997 | Reibel et al. | ................ 455/343 |
| 5,778,316 A | 7/1998 | Persson et al. | |
| 5,870,673 A | * 2/1999 | Haartsen | ...................... 455/426 |
| 5,878,033 A | * 3/1999 | Mouly | ........................ 370/312 |
| 5,929,776 A | * 7/1999 | Warble et al. | .......... 340/825.44 |
| 5,943,332 A | * 8/1999 | Liu et al. | .................... 370/342 |
| 6,091,949 A | * 7/2000 | Sanchez | ...................... 455/417 |
| 6,138,034 A | * 10/2000 | Wiley | ......................... 455/522 |

FOREIGN PATENT DOCUMENTS

| | | | |
|---|---|---|---|
| WO | 98/28931 A | 7/1998 | |
| WO | 98-28931 A | * 7/1998 | ............ H04Q/7/20 |

* cited by examiner

Primary Examiner—Dwayne Bost
Assistant Examiner—Miguel D. Green
(74) Attorney, Agent, or Firm—Nixon & Vanderhye P.C.

(57) ABSTRACT

The present invention coordinates paging, network restriction, and other network-based communications (e.g., mobile measurement requests for O&M) in a mobile telecommunications network. Paging messages, network messages, and other messages may be consolidated in one message so that the mobile need only power up once to retrieve the various information provided in the one message. In one example, non-limiting embodiment, paging groups of mobile stations and network access restriction groups of mobile stations are merged into a single set of paging and network access restriction groups to which different mobile stations belong. A mobile station therefore need only process one message in order to be informed about paging and network access restriction information pertinent to that mobile station. In the example mobile groups embodiment, that one message corresponds to its consolidated paging and network access group, and the single paging and network access group message is transmitted during a specified time interval associated with the group. As a result, an idle mobile station belonging to that group need only leave a power savings sleep mode to receive that message during the specified group time interval. Otherwise, the idle mobile station can return to the power savings sleep mode to conserve its battery life.

41 Claims, 8 Drawing Sheets

Broadcast Channel (BCH)

| Network, Operator, Cell IDs | No. of Paging Groups | Paging Channel(s) | Access Parameters | Supported Cell Services | ... | Output Power of BCH |
|---|---|---|---|---|---|---|

*Fig. 3*

Access Parameters

| Mobile Group Identifier | Location/ Registration | Call Origination | Peak Bit Rate | Initial Power | Peak Power | Other Parameters |
|---|---|---|---|---|---|---|

Paging and Network Restriction Group Message

| Page Indicator | Network Restriction Indicator | Paging Message (Mobile IDs) | Network Restriction Message |
|---|---|---|---|

Fig. 10

Paging and Network Restriction Group Message

| Page Indicator | Network Restriction Indicator (Read BCH for Access Restriction) | Paging Message (Mobile IDs) |
|---|---|---|

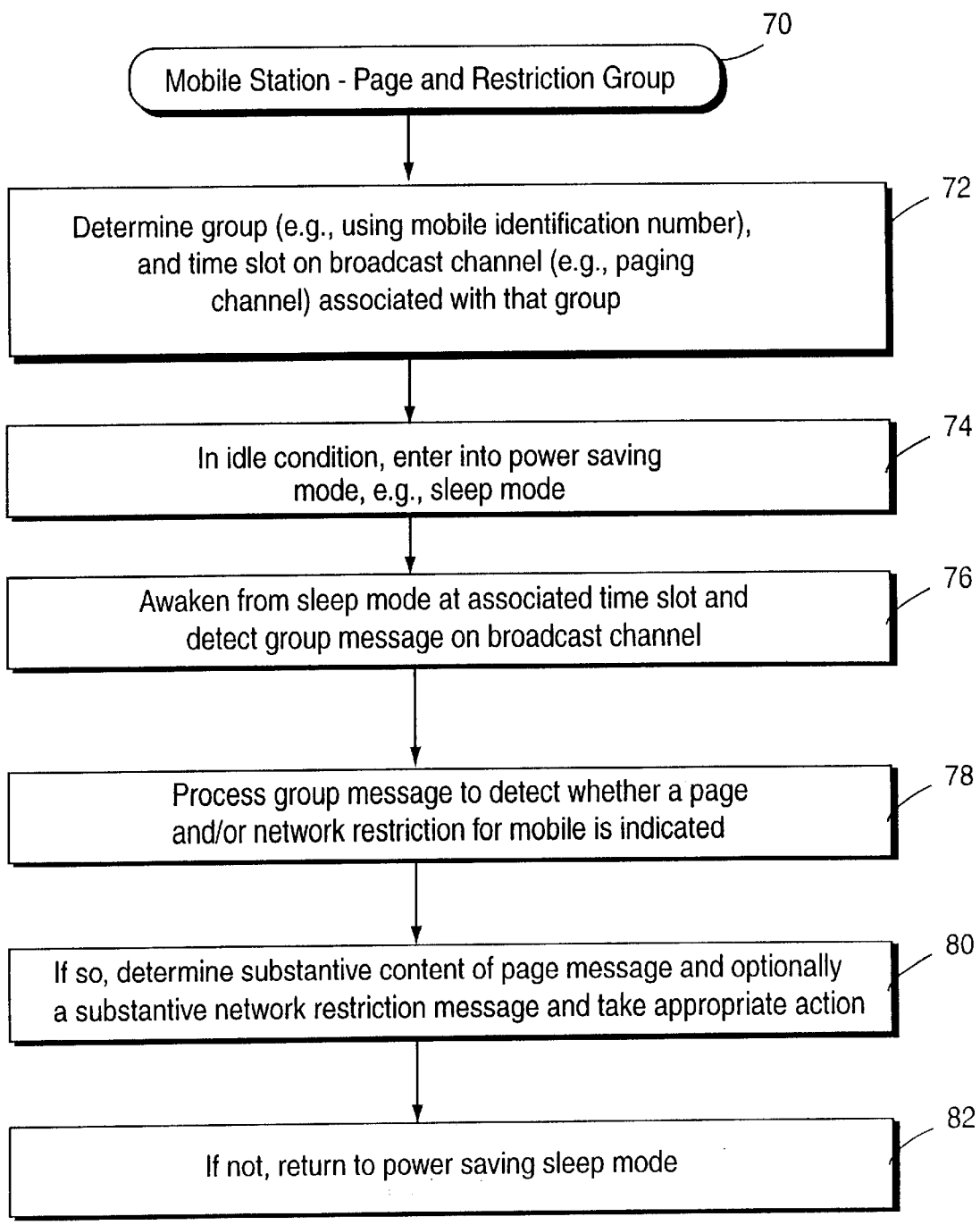

COORDINATING DIFFERENT TYPES OF MESSAGES SENT TO MOBILE RADIOS IN A MOBILE COMMUNICATIONS SYSTEM

FIELD OF THE INVENTION

The present invention relates to wireless communication systems, and more particularly, to a method and apparatus for efficiently communicating different types of control messages between a radio network and a mobile radio station.

BACKGROUND AND SUMMARY OF THE INVENTION

In a typical cellular radio system, a geographical area is divided into cell areas served by base stations which are connected to a radio network. Each user (mobile subscriber) in the cellular radio system is provided with a portable, pocket, hand-held, or car mounted mobile station which communicates voice and/or data with the mobile network. Each base station includes a plurality of channel units including a transmitter, a receiver, and a controller and may be equipped with an omnidirectional antenna for transmitting equally in all directions or with directional antennas, each directional antenna serving a particular sector cell. Each mobile station also includes a transmitter, a receiver, a controller, and a user interface and is identified by a specific mobile station identifier. Each mobile subscriber is identified by another identifier, e.g., an international mobile subscription number (IMSI).

The growth of cellular radio telephone systems has compelled system designers to search for ways to increase capacity. One way to achieve this goal is to increase communications efficiency over the radio interface between the radio network and mobile radio stations. A large portion of the radio bandwidth available at this interface is allocated to carrying substantive traffic between mobile stations and the radio network. However, there is also a considerable amount of control information that must be transmitted between mobile stations and the radio network to perform various operations such as mobile registration, paging, call setup, handover, etc. Some of these operations occur quite frequently. Where possible, it is desirable to reduce the volume and frequency of such signaling to increase the amount of radio bandwidth available for substantive traffic, i.e., increased system capacity.

Besides a limited amount of radio bandwidth, another significant aspect of mobile radio communications is that batteries which power the mobile radio stations have a limited life before recharging is necessary. At least from a user's perspective, the portability of mobile radios is enhanced as the size of those portable radios decreases. But smaller battery size typically results in shorter battery life. Accordingly, a desirable objective is to minimize the drain on a mobile's battery while still providing reasonable access so the mobile radio can be quickly located by the radio network, e.g., in order to set up a call.

In traditional analog cellular systems, when a mobile station is idle, (not using a traffic channel), it tunes to and continuously monitors a control channel corresponding to its current cell in the network. As a result, the mobile can continuously determine whether a page message addressed to it has been received over a control channel. If so, the mobile then transmits a page response over the control channel to the base station which forwards the page response to the radio network. Upon receiving the page response, the radio network selects an available voice channel in the cell from which the page response was received and requests the base station in that cell to order the mobile station via the control channel to establish a through connection. Unfortunately, continuous monitoring of the control channel is a substantial drain on the mobile station battery.

In addition to control messages initiated by the radio network, e.g., pages, a mobile station may access the network to initiate a call by dialing the telephone number and pressing the "SEND" button on the telephone handset. A control signal including the mobile station identifier and the dialed telephone number is transmitted over the control channel to the base station and forwarded to the radio network which validates the mobile station, assigns a traffic channel, and establishes a through connection. If a mobile station moves between cells while a connection is established, a "handover" of that connection takes place between the cells. Handover also requires control signaling over the radio interface.

In addition to call origination and page responses requiring the mobile to access the radio network using control signals, a mobile station often must access the radio network for purposes of location registration. For example, the mobile may periodically register with the radio network so that the network knows the cell, location area, or registration area in which the idle mobile station is currently located. In addition, the idle mobile station also preferably registers with a new cell each time it passes a cell or other area border.

As cellular systems have evolved, plural control channels have been used such as a general system broadcast channel (BCH), a paging channel (PCH), a reverse access channel (RACH) used by mobiles to access the radio network, and forward access channel (FACH) used by the base station to acknowledge mobile accesses over the RACH. In more sophisticated cellular systems, control signaling carried by control channels may be Time-Division Multiplexed (TDM) meaning that one or more mobile stations are assigned or associated with one timeslot in repeated frames of multiple timeslots. One benefit of this TDM approach is that during the other timeslots, an idle mobile station can enter a power savings or sleep mode to extend the life of the mobile's battery. For example, mobile stations may be divided into different paging groups with each paging group being assigned a particular timeslot on a paging control channel. Rather than all mobiles listening to the paging channel for pages all of the time, an idle mobile station need only wake up from sleep mode and monitor the particular timeslot on the paging channel assigned to the paging group to which the mobile station belongs. The mobile station can "sleep" during the other timeslots to save battery power. The amount of time the mobile spends reading paging messages and the time spent asleep represents a tradeoff between call setup delay and power consumption.

An example paging channel format with paging groups is shown in FIG. 1. The paging channel is divided into plural blocks 1, ..., N. corresponding to successive timeslots in a frame. The paging blocks/timeslots are repeated in each successive frame. Paging groups i, i+1, i+2, ..., i+N−1 may be assigned either statically or dynamically to a corresponding block. Each block corresponding to a paging group includes a page indicator field indicating whether a page currently exists for a mobile in that particular paging group along with a paging message which includes an identification of specific mobile(s) in the group being paged.

Current cellular systems are of the "multiple access" type and therefore must regulate access to limited communication resources by large numbers of mobile stations. As described earlier, mobile stations frequently require access to the radio network in order to register, respond to a page, originate a call, etc. It is therefore desirable to establish access restriction procedures that limit the number of mobiles and/or mobile types which are allowed to perform a particular access procedure, e.g., registration, call origination, etc. Without such restrictions, multiple collisions and large numbers of unsuccessful access attempts may occur. Such collisions, unsuccessful accesses, and successive access re-attempts result in inefficient use of the system and channel resources. Access restrictions may also specify a maximum number of access attempts in a particular time span for a particular mobile access group, a particular minimum mobile priority status or level of service, etc.

One manner for regulating mobile access to the radio communications network is now described in conjunction with an example, uplink random access channel (RACH) illustrated in FIG. 2. The random access channel is divided into multiple access slots 1, 2, . . . , i similar to slotted ALOHA. A mobile station may only transmit over the random access channel at a number of well defined time offsets, e.g., 1.25 millisecond offsets. The first access slot is aligned with the frame boundary of a downlink broadcast channel transmitted by the base station. These offsets help achieve orderly random access over a common channel potentially shared by many users. The radio network may restrict certain mobiles so that they are prevented from transmitting over any access slot on the random access channel for one or more types of access operations and/or for certain time periods.

In addition, specific restriction access parameters may be broadcast by the base station over a general broadcast channel. FIG. 3 shows a simplified example format of a broadcast channel which includes one or more initial identification fields identifying possibly the radio network, the particular operator, and the cell or base station. The broadcast channel may also include a field which indicates the number of current paging groups in the cell as well as the specific paging channel for that cell. Still further, the broadcast channel includes an access parameters field setting forth the current access restrictions being enforced in the cell. The broadcast message may also include other fields such as a supported cell services field, the output power at which the broadcast channel is being transmitted by the base station, identification of neighboring cells to be used in an idle mode, and fields containing other information which is not particularly relevant to the present invention.

FIG. 4 illustrates various example types of information that may be included in the access parameters field of the broadcast channel. One or more network access restriction parameters may be associated with different access groups of mobile stations, each mobile access group having its own identifier. In this example, the access parameters include a mobile group identifier field along with access restrictions such as a location/registration restriction, a call origination restriction, a peak bit transmission bit rate restriction, an initial power transmission restriction, and a peak power transmission restriction. Of course, one or more other restriction parameters may be employed. Moreover, other broadcasting formats may be employed, e.g., one or more access restriction groups are specified and then the restriction parameter(s) valid for the specified groups are broadcast only once or a few times.

FIG. 5 illustrates an example mobile access group restriction configuration. The mobile stations are assigned to one of eight access restriction groups. Attempts by mobile stations to access the radio network are controlled by restricting or outright prohibiting origination/location registration access messages from the mobile stations. In FIG. 5, access restriction groups 1 and 2 are restricted during a first restriction cycle interval, followed by groups 3 and 4, groups 5 and 6, and groups 7 and 8 being restricted in corresponding access restriction time intervals. After the restriction interval is completed for groups 7 and 8, the cycle repeats. The groups under restriction are changed periodically so as not to unfairly bias the restriction to certain access groups. This type of restriction information may be transmit in the access parameters field of the broadcast channel. During the time period an access group restriction is being enforced, any mobile stations belonging to the restricted access group which ignore the restriction and perform a call origination or location registration are detected, and further processes for those mobile stations are suspended. Presumably, most mobiles will comply with applicable restrictions. Of course, this is just an example, and different types of restrictions and restriction allocations could be employed.

The radio network therefore must frequently inform various mobile stations of changes in and the current status of the group of mobiles currently under restriction. Any time the radio network channel updates or otherwise changes the access parameters affecting one or more access restriction groups of mobile stations, the mobile stations in those groups must be specifically paged, and after receiving a page, tune to the broadcast channel so they can each decode the broadcast access parameters to become aware of the new network access restriction information. In current cellular systems, all mobiles in all access restriction groups must be paged since access restriction groups are not coordinated with mobile paging groups.

While such an approach to radio network access restriction is beneficial for controlling access to radio network services, it has a significant disadvantage. The mobile stations must be regularly paged specifically for the purpose of having the mobiles check the broadcast channel to obtain the current (and regularly changing) access restriction status information. Consequently, all of the mobile stations must regularly power-up out of sleep mode during all paging time slots to detect these pages which causes considerable drain on the mobile's battery power. However, such pages are usually only relevant to a few of the mobile stations. What is needed is a way in which the mobile station can still regularly receive both paging information for the mobile or its paging group as well as access restriction information pertinent to that mobile or to its mobile access group relative to that mobile while at the same time conserve its battery power.

The present invention meets this need by coordinating paging, access restriction, and/or other network communications in a mobile telecommunications network. An example of another network communication is a request from the radio network sent to one or more mobiles requesting that those mobiles measure certain parameters, e.g., signal strength. The returned signal strength values may be used by the network for operations or maintenance tasks like system planning, etc. Indeed, the invention permits any set of activities that apply to one or more mobiles to be coordinated so that each such mobile need only power up once to receive all of the information related to that set of activities.

In one example, non-limiting embodiment, paging messages and network restriction messages are consolidated in one message. Paging groups of mobile stations and network access restriction groups of mobile stations are merged into a single set of paging and network access restriction groups to which different mobile stations belong. A mobile station therefore need only process one message in order to be informed about paging and network access restriction information pertinent to that mobile station. In this example, that one message corresponds to its consolidated paging and network access group, and the single paging and network access group message is transmitted during a specified time interval associated with the group. As a result, an idle mobile station belonging to that group need only leave a power savings sleep mode to receive that message during the specified group time interval. Otherwise, the idle mobile station can return to the power savings sleep mode to conserve its battery life.

An example method performed by a mobile station in accordance with the present invention includes the mobile station determining the time when it is to receive information transmit from the radio network. At that determined time, a message is received from the radio network, and the mobile determines if paging, access restriction, or other type of network information pertaining to that mobile is included in the message. If the mobile has been paged, it acknowledges the page. On the other hand, if the mobile has not been paged, it powers down to conserve battery life. If the mobile determines that the message contains an access restriction or other network message, it responds accordingly.

In the example paging and network access restriction embodiment, one or more nodes in the radio network establishes plural groups for mobile stations, each group being associated with one of plural specified time intervals. At a first time interval associated with a first one of the groups, the radio network node transmits a first message including information relating to paging and one or more radio network access restrictions pertaining to the first group of mobile stations. At a second time interval associated with a second one of the groups, the radio network node transmits a second message including information relating to paging and one or more radio network restrictions pertaining to the second group of mobile stations. The message may be a paging message transmit over an existing paging channel, and the first and second groups may correspond to first and second paging groups that also incorporate information corresponding to first and second network access restriction groups. The radio network node determines if a page exists to one of the mobile stations in the first (second) group, and if so, indicates in the first (second) message that a page should be read by the mobile stations in the first (second) group. In addition, the radio network node determines if a network access restriction exists for one or more mobile stations in the first (second) group and, if so, indicates the same in the first message.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout. While individual functional blocks and components are shown in many of the figures, those skilled in the art will appreciate that these functions may be performed by individual hardware circuits, by a suitably programmed digital microprocessor, by an application specific integrated circuit (ASIC), and/or by one or more digital signaling processors DSPs).

FIG. 3 illustrates a simplified format of an example broadcast channel;

FIG. 4 illustrates several example access parameters that may be included in an access parameters field in the broadcast channel shown in FIG. 3;

FIG. 9 is a paging and network access restriction message in accordance with one example embodiment of the invention;

FIG. 10 illustrates another example of a paging and network access restriction message in accordance with another example embodiment of the present invention;

FIG. 12 is a flowchart illustrating example procedures corresponding to the Page and Restriction Group routine of FIG. 11 that may be carried out by a mobile station.

DETAILED DESCRIPTION OF THE DRAWINGS

In the following description, for purposes of explanation and not limitation, specific details are set forth, such as particular embodiments, data flows, signaling implementations, protocols, techniques, etc., in order to provide an understanding of the present invention. However, it will be apparent to one skilled in the art that the present invention may be practiced in other embodiments that depart from these specific details. For example, while the present invention is disclosed in the context of paging and radio network access restrictions, those skilled in the art will appreciate that the present invention can be applied to other contexts as well, e.g., to other network messages like those relating to mobile measurement request reports used for O&M tasks performed by the radio network. Indeed, the invention may be used to coordinate a set of any activities that apply to one or a group of mobiles. In other instances, detailed descriptions of well-known methods, interfaces, devices, and signaling techniques are omitted so as not to obscure the description of the present invention with unnecessary detail.

Figure 6:
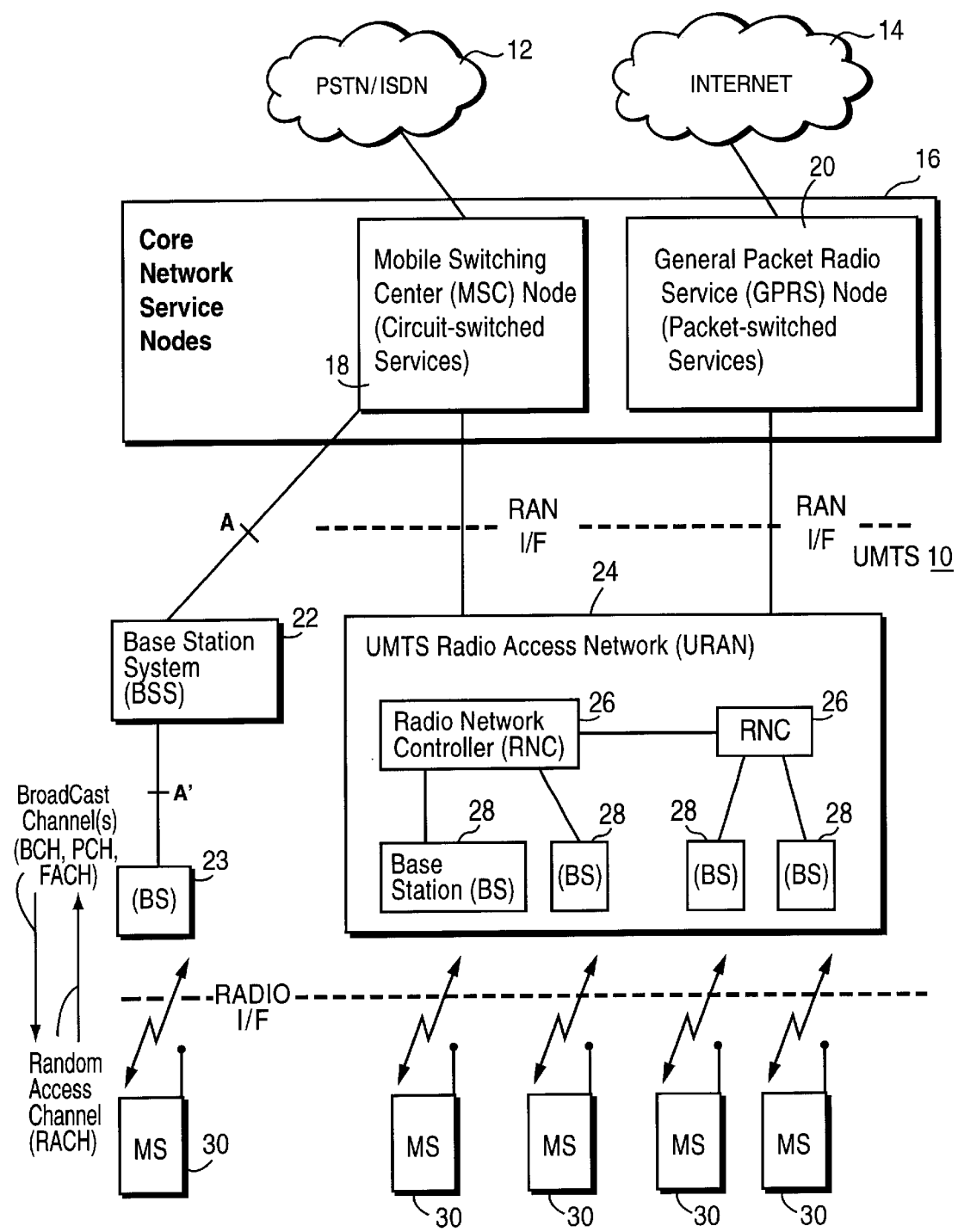
FIG. 6 illustrates an example mobile communications system in which the present invention may be employed.

The present invention is described in the non-limiting, example context of a universal mobile telecommunications system (UMTS) 10 shown in FIG. 6. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/IDSN connection-oriented network 12 is connected to a connection-oriented service node shown as a Mobile Switching Center (MSC) node 18 that provides circuit-switched services. In the existing GSM model, the MSC 18 is connected over an interface A to a Base Station Subsystem (BSS) 22 which in turn is connected to radio base station 23 over interface A. The Internet connectionless-oriented network 14 is connected to a General Packet Radio Service (GPRS) node 20 tailored to provide packet-switched type services sometimes referred to as the serving GPRS service node (SGSN). Each of the core network service nodes 18 and 20 connects to a UMTS Radio Access Network (URAN) 24 over a radio access network (RAN) interface. URAN 24 includes one or more radio network controllers 26. Each RNC 26 is connected to a plurality of base stations (BS) 28 and to any other RNCs in the URAN 24.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each mobile station 30 is assigned its own scrambling code in order for a base station 28 to identify transmissions from that particular mobile station as well as for the mobile station to identify transmissions from the base station intended for that mobile station from all of the other transmissions and noise present in the same area.

Figure 1:
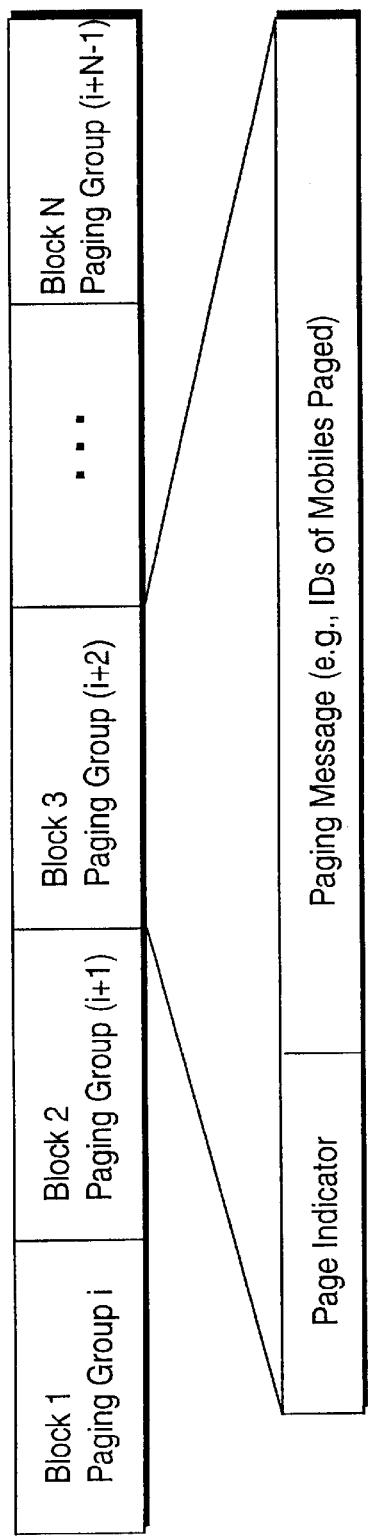
FIG. 1 shows a simplified format of an example paging channel.
Figure 2:
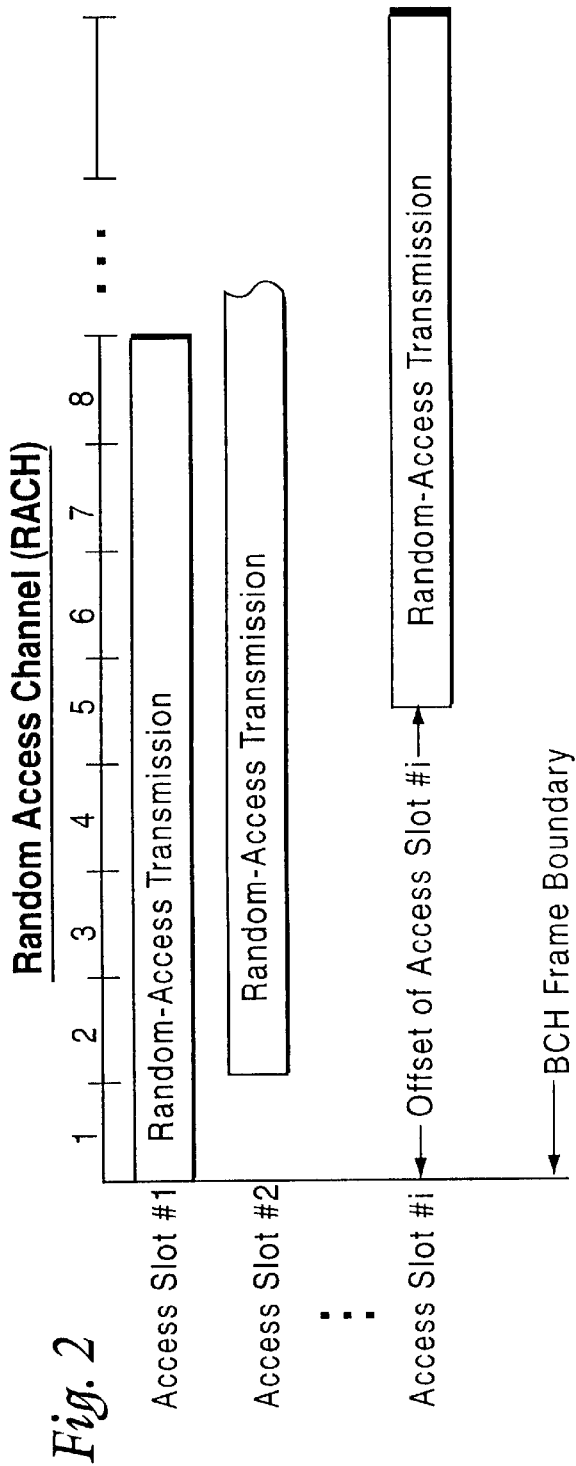
FIG. 2 illustrates a simplified format of an example random access channel.
Figure 5:
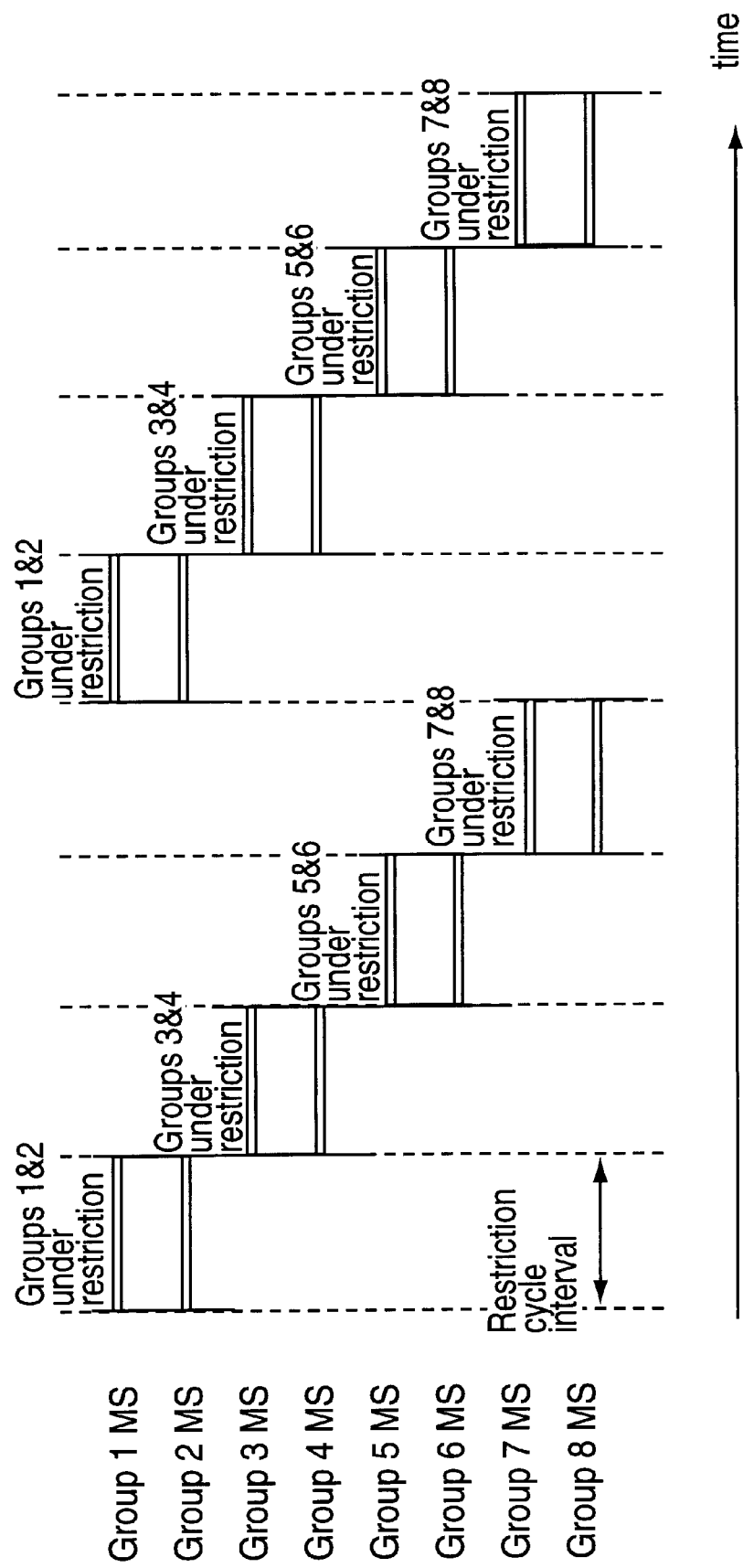
FIG. 5 illustrates an example showing various groups of mobile stations subject to access restrictions.

Different types of control channels are shown between one of the base stations 28 and mobile stations 30. For example, in the forward or downlink direction, there are several types of broadcast channels including a general broadcast channel (BCH) such as that described in FIG. 3, a paging channel (PCH) such as that described in FIG. 1, and a forward access channel (FACH) for providing various other types of control messages to mobile stations. In the reverse or uplink direction, a random access channel (RACH), such as that described in FIG. 2, is employed by mobile stations whenever access is desired to perform location registration, call origination, page response, and other types of access operations.

Figure 7:
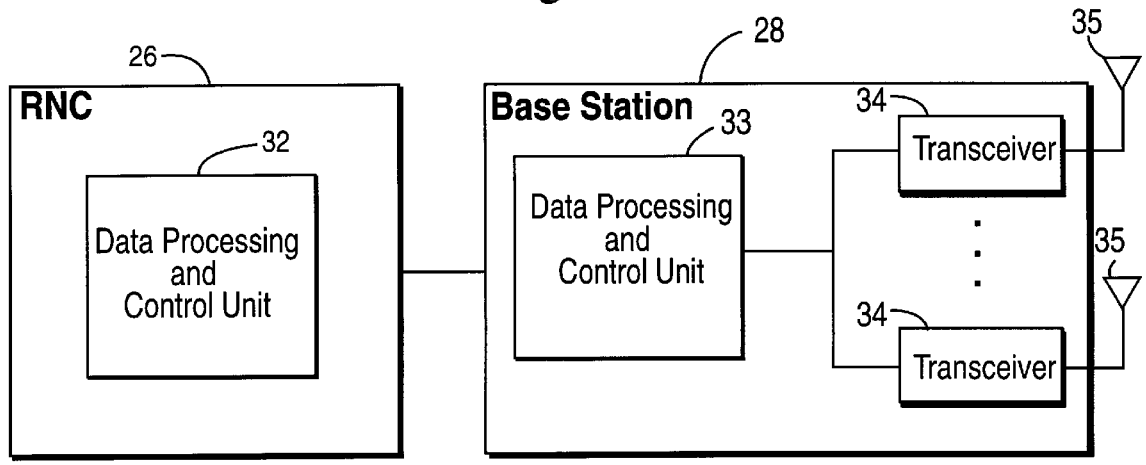
FIG. 7 is a function block diagram of a base station shown in FIG. 6.
Figure 8:
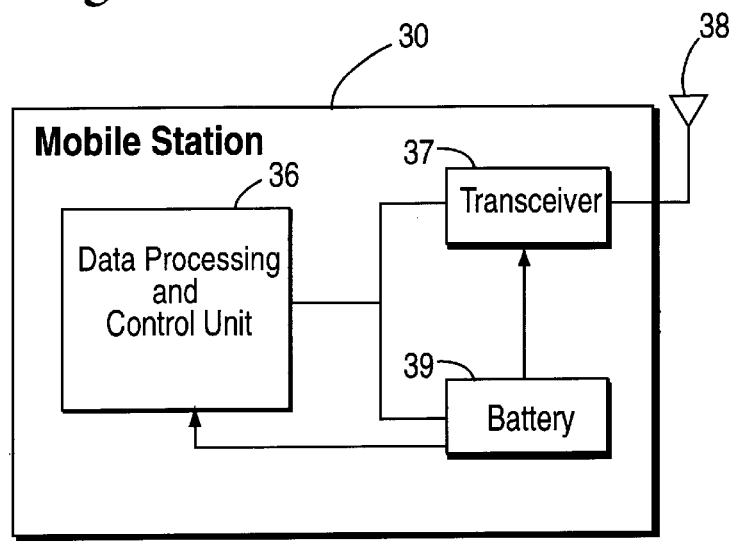
FIG. 8 is a function block diagram of a mobile station shown in FIG. 6.

The radio network controller 26 and base station 28 shown in FIG. 7 are radio network nodes that each include a corresponding data processing and control unit 32 and 33 for performing numerous radio and data processing operations required to conduct communications between the RNC 26 and the mobile stations 30. Part of the equipment controlled by the base station data processing and control unit 33 includes plural radio transceivers 34 connected to one or more antennas 35. The mobile station 30 shown in FIG. 8 also includes a data processing and control unit 36 for controlling the various operations required by the mobile station. The mobile's data processing and control unit 36 provides control signals as well as data to a radio transceiver 37 connected to an antenna 38. Both the data processing and control unit 36 and transceiver 37 are powered from voltage supplied by battery 39. The amount of power supplied by the battery 39 to the data processing and control unit 36 and transceiver 37 is regulated by one or more control signals from the data processing and control unit 36.

The present invention may be employed in the context of the example mobile communications system 10 shown in FIG. 6 in which the radio network controllers 26 and base stations 28 form a radio access network between a core network node (like the MSC 18) and the mobile stations 30. In the following example embodiment, the RNC node 26 preferably establishes or otherwise configures plural mobile station groups. It should be appreciated that the present invention is not limited to the following "mobile group" example embodiment. Indeed, the invention also includes coordinating network message information pertinent to an individual mobile station so that such information can be communicated in the same message at the same time to that mobile station thereby requiring the mobile to power up only once.

The non-limiting example embodiment illustrates the invention using paging and network access information and paging and network access mobile groups. The RNC 26 establishes paging and network access groups so that paging messages and radio access network restriction messages can be coordinated and efficiently delivered to mobile stations 30 in a manner which permits the mobile stations to conserve battery power. Although radio network access restrictions are described for this example embodiment, other radio network restrictions may be employed such as service restrictions where only certain groups of mobiles are currently allowed to use certain services.

Each established paging and radio network access restriction mobile group is associated with one of several specified time intervals on a forward broadcast channel. In this example embodiment, that broadcast channel is the paging channel (PCH), but another type of broadcast channel may be used. Because the paging channel is used, the various established mobile groups correspond with paging channel time intervals associated with mobile paging groups. The radio access network and the mobile stations both are either informed of the group to which a specific mobile belongs or they determine the mobile group number using for example an algorithm that processes the mobile station's unique identification number and perhaps other parameters to generate a corresponding group number. The mobile then determines the correct timeslot and paging channel using the paging channel configuration parameters in the algorithm that determine the paging group. Moreover, if several network access groups are assigned to a paging group, the paging message may indicate to which particular access group a current network access restriction applies.

To generate messages for each of the paging and network access restriction groups, the radio network controller 26 determines if a page exists for one or more of the mobile stations in each of the groups. If so, it indicates in the message to be broadcast for that specific group that a page message should be read by the mobile stations in that group. Similarly, the RNC 26 determines if a network restriction exists for a mobile station in each mobile group, and if so, indicates in the message that is broadcast to that group that a network restriction exists.

The indication for the existence of a page and/or a network restriction may include for example the setting of one or more bit flags. A set flag may also indicate that two separate types of messages are being sent during the same time period. In addition, although not necessarily, the message broadcast over the paging channel can include a substantive network restriction message. Alternatively, the indication in the message that a network restriction exists may be interpreted by the mobile station as a command to check the broadcast channel for a network restriction included in a broadcast message.

At a first paging timeslot associated with the first one of the groups, the RNC 26 transmits a first message that includes information relating both to paging and to one or more radio network access restrictions that pertain to the first group of mobile stations. At a second time interval, paging timeslots associated with the second one of the groups, the radio network controller 26 via one or more base stations 28 transmits a second message over one or more paging channels including information relating to paging and to one or more radio network access restrictions pertaining specifically to the second group of mobile stations.

The mobile station 30 is provided with or alternatively determines its paging and network access restriction group using, for example, its mobile identification number and also determines the paging time interval when it should listen for pages for its group that will be transmitted over the paging channel. Initially, when the mobile station is turned on, it must check the broadcast channel for any access restrictions for its group. Thereafter, an idle but still powered-on mobile station conserves battery power by entering a sleep, battery conservation mode. The mobile's data processing unit 36 performs only essential minimum functions including monitoring a clock or timer. When the mobile's group time interval arrives, unit 36 leaves the sleep mode and supplies battery power to transceiver 37 which tunes to the paging channel, receives the message, and reads the message transmit during that time interval. If there are no messages for its group, the control unit 36 returns the mobile station to the battery conservation sleep mode. For example, the data processing and control unit 36 removes battery power from non-essential elements of the mobile station.

On the other hand, if the message for that mobile's group indicates the presence of message content, i.e., a page and/or a network access restriction message, the mobile's data processing and control circuit 36 continues to process the message to detect its content and take appropriate action. If a page is detected, the mobile station responds via an available access slot on the a random access channel like that shown in FIG. 2 to acknowledge the page and to identify its current location (e.g., cell) within the radio network. If a network access restriction message is received, the mobile station's data processing and control circuit may either detect a substantive access network restriction in the received message itself or it may detect network access restrictions being broadcast on another channel by base station 28, e.g., in the access parameters field of the general broadcast message similar to that shown in FIG. 3.

Network restriction information indicates, for example, whether an access restriction is in effect for the group and may also include one or more restrictions on a particular type of access to the radio network over a random access channel (RACH) shared by multiple mobile radios. Types of access include the mobile registering from an area in the network, e.g., a new cell, and the mobile originating a call. Further example network access restrictions include whether a location registration operation is permitted for the group, whether an originating call operation is permitted, what peak data rate is permitted, what peak transmission power level is permitted, a minimum level of mobile subscriber priority permitted, or a particular level of service permitted. Other restriction parameters may also be specified.

FIG. 9 shows an example format of a paging and network restriction group message sent during a specified time interval over a paging channel. A page indicator field may simply include a flag to indicate whether the message includes a paging message. The network restriction indicator may also be a flag which indicates whether a network restriction is currently in effect for the mobiles in this group. The substantive paging message, including the mobile ID of each mobile being paged in the group, is provided in the next field. In this embodiment, the following field includes a substantive network restriction message currently in force for this mobile group. If the network restriction indicator is set, the mobile's data processing and control unit 36 reads the network restriction message and complies with that restriction.

FIG. 10 shows an alternative example format for the paging and network restriction group message. A page indicator field and a substantive paging message field are included as in FIG. 9. However, the network restriction message is not included. Instead the network restriction indicator itself is interpreted by the mobile. If there is only one type of network restriction, the mobile station need only determine whether the network restriction indicator is set. If there is more than one restriction, a set flag in the network restriction indicator field will cause the mobile station to tune to a broadcast channel like that shown in FIG. 3 to determine from the access parameter field the content of the specific network restriction applicable to its group.

Figure 11:
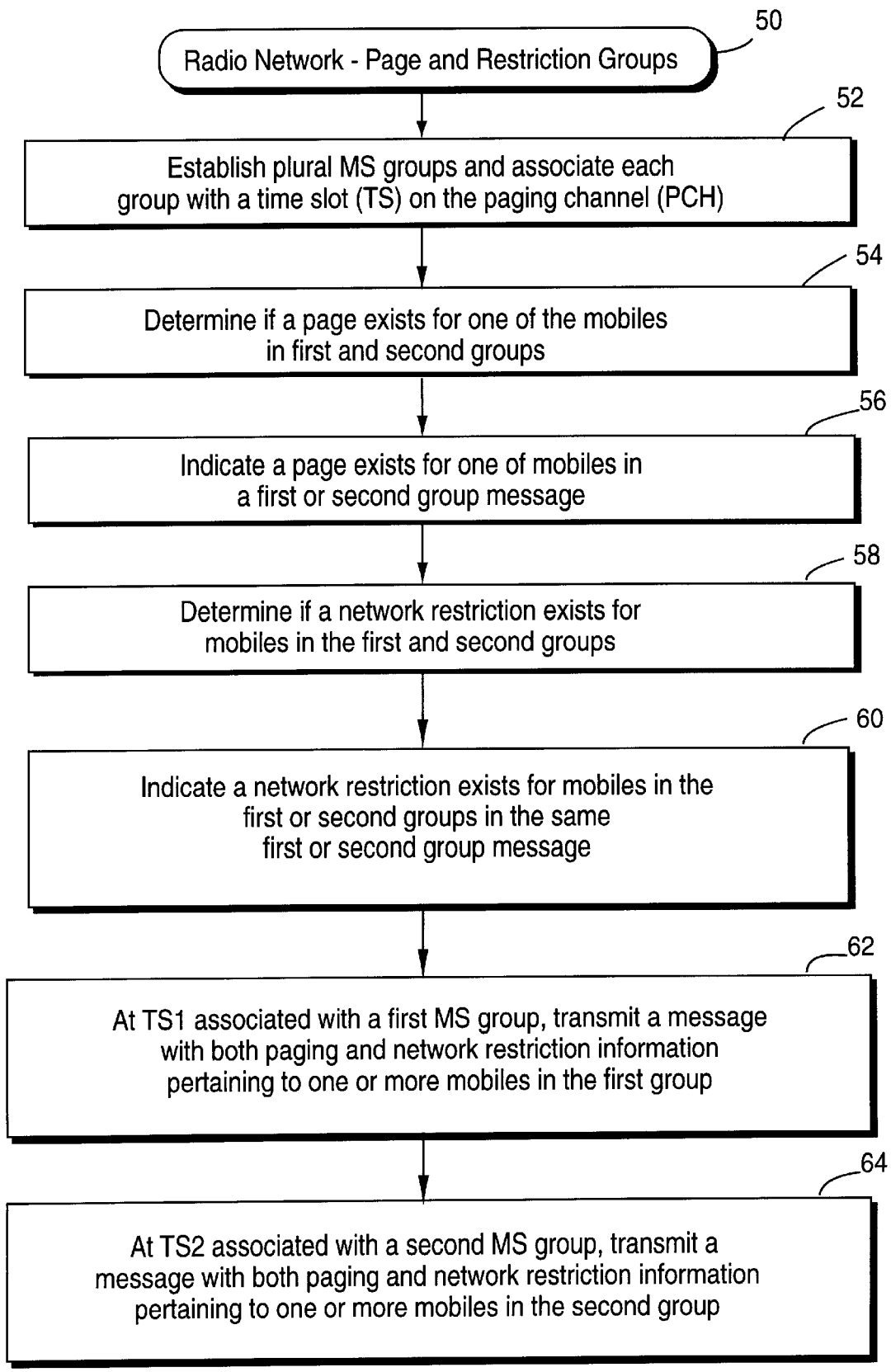
FIG. 11 illustrates in flowchart form an example Page and Restriction Groups routine that may be carried out by the radio network.

FIG. 11 illustrates in flowchart format example procedures from the perspective of the radio network for coordinating pages and network access restrictions in accordance with the example embodiment described above (block 50). The radio network, e.g., the RNC, establishes plural mobile station groups and associates each group with a timeslot or time interval on the paging channel (PCH) (block 52). The RNC also identifies mobiles with one of these established groups, e.g., using an algorithm based on mobile identification numbers. The RNC determines if a page exists for one of the mobiles in each of the paging restriction groups, and in a simple example, for first and second groups (block 54). If a page does exist for one of the mobiles in either of these two groups, the RNC indicates that fact by setting the page indicator field in the corresponding group message (block 56). The RNC also determines if a network restriction exists for mobiles in either the first or second page and network access restriction groups (block 58). If a network access restriction exists for mobiles in either the first (second) group, the RNC indicates the same in the corresponding first (second) group message (block 60). At timeslot TS1 associated with the first page and network access restriction group, the radio network controller transmits a first message including both paging and restriction information (if any) pertaining to one or more mobiles in the first page and network access restriction group (block 62). Similarly, at the timeslot TS2 associated with the second page and network access restriction group, the RNC transmits a second message with both paging and network access restriction information (if any) pertaining to one or more mobile stations in the second page and network access restriction group (block 64).

Continuing with this example embodiment, a page and network access restriction group routine (block 70) implemented by the mobile station is described in conjunction with the procedures outlined in the flowchart shown in FIG. 12. The mobile station determines its corresponding page and network access restriction group using for example its mobile identification number. The mobile station also determines the timeslot on the paging channel that is associated with that determined group (block 72). In an idle condition, the mobile station enters into a power saving or sleep mode (block 74). Periodically, the mobile station awakens from that battery conserving sleep mode at its associated group time slot and checks the group message on the paging channel (block 76). The group message is processed to detect whether a page and/or network access restriction is indicated (block 78). If so, the mobile station determines the substantive content of the paging message, and in particular whether it specifically has been paged. In the example embodiment shown in FIG. 9, the mobile may also determine the substantive content of the network restriction. Alternatively, in the example in FIG. 10, if an access restriction is indicated, the mobile tunes to the broadcast channel to detect the specific network access restriction (block 80). If neither a page nor a network restriction is indicated for that mobile's page and restriction group, the mobile station returns to its power saving sleep mode (block 82).

By coordinating and consolidating different types of messages to be sent to a mobile or to a group of mobiles, the present invention provides an efficient and effective mechanism to provide control signaling type information to the mobile station while at the same time permitting the mobile station to conserve its battery power. The non-limiting, example embodiment shows how the radio network can be provided with considerable flexibility in allocating access to limited network services and resources; but at the same time, the radio network is able to fairly distribute, on a time share basis, network restrictions across various mobiles/groups of mobiles. This flexibility and fairness are achieved without mobile stations having to listen at different times for network access restriction messages and for paging messages. The invention also reduces the number of control messages separately sent to mobiles, and therefore, reduces the interference in the system. Lower interference means, for example, that signals may be transmitted at lower output power which increases system capacity.

While the present invention has been described with respect to a particular embodiment, those skilled in the art will recognize that the present invention is not limited to any specific embodiment described or illustrated herein. Different formats, embodiments, and adaptations besides those shown and described as well as many modifications, variations, and equivalent arrangements may also be used to implement the invention. It is to be understood that this disclosure is only illustrative and exemplary of the present invention.

What is claimed is:

1. A method performed by one of plural mobile radio stations communicating via a radio network, comprising:

(a) determining a time interval when the one mobile station is to receive information transmitted from the radio network;

(b) at that determined time interval, receiving a message transmission from the radio network including a first message of a first type and a second message of a second different type; and (c) determining if any of the first message or the second message in the message transmission pertains to the one mobile station, wherein the mobile station determines from the message transmission whether it has been paged and whether its access to the network is restricted.

2. The method in claim 1, wherein the message transmission is transmit over a paging channel, the first message includes paging information, and wherein at the determined time interval, the mobile station leaves a power savings mode of operation, the method further comprising:

determining from the message transmission if the one mobile station has been paged;

if so, responding to the page; and if not, returning to the power savings mode of operation.

3. The method in claim 2 wherein the one mobile station belongs to one of a plurality of paging groups, each paging group being assigned a different time interval during which paging messages corresponding to that paging group are transmitted over the paging channel.

4. The method in claim 3, wherein the one mobile station belongs to one of a plurality of access groups, and the second message includes network information which indicates whether an access restriction is in effect for the one access group, the method comprising:

detecting whether the second message indicates an access restriction for the one access group, and if so, complying with the access restriction.

5. The method in claim 4, wherein the access restriction includes a restriction on a type of access to the network over a random access channel shared by multiple mobile radios.

6. The method in claim 5 wherein the type of access includes registering from an area in the network and originating a call.

7. The method in claim 4, wherein the access restriction information includes whether a location registration operation is permitted for the one access restriction group, whether an originating call operation is permitted for the one access restriction group, whether a peak data rate is permitted for the one access restriction group, whether a peak transmission power level is permitted for the one access restriction group, whether a level of mobile subscriber priority is permitted for the one access restriction group, or whether a level of service is permitted for the one access restriction group.

8. The method in claim 2, wherein the second message includes measurement request information requesting the one mobile station to perform a measurement operation and report a measurement result to the radio network.

9. The method in claim 3, further comprising:

determining from the first message whether a page exists for the one mobile station and whether restriction information exists for the group.

10. The method in claim 9, further comprising:

if restriction information exists for the group, detecting information provided from the network that specifies the restriction information for the group, and otherwise, if restriction information does not exist for the group, entering into a power savings mode.

11. The method in claim 9, if restriction information exists for the group, detecting information included with the paging message that specifies restriction information for the one access group, and otherwise, if restriction information does not exist for the group, entering into a power savings mode.

12. The method in claim 3, further comprising:

determining the group using an identifier corresponding to the one mobile station.

13. A method performed by one of plural mobile radio stations communicating via a radio network, comprising:

(a) determining a time when the one mobile station is to receive information transmitted from the radio network;

(b) at that determined time interval, receiving a message transmission from the radio network including a first message of a first type and a second message of a second different type; and (c) determining if any of the first message or the second message in the message transmission pertains to the one mobile station, wherein the determining step (c) includes checking if a flag is set.

14. The method in claim 1 wherein the mobile station determines from the message transmission whether it has been paged and whether its access to the network is restricted in order to conserve battery power.

15. In a telecommunications system having a plurality of mobile radio stations communicating via a radio network, a node in the radio network performing a method, comprising:

establishing plural groups for mobile stations, each group being associated with one of plural specified time intervals;

at a first time interval associated with a first one of the groups, transmitting a first message including information relating to paging and one or more radio network restrictions pertaining to the first group of mobile stations; and at a second time interval associated with a second one of the groups, transmitting a second message including information relating to paging and one or more radio network restrictions pertaining to the second group of mobile stations.

16. The method in claim 15, wherein the first and second messages are paging messages transmitted over a paging channel and the first and second groups are paging groups.

17. The method in claim 16, wherein the first and second groups also correspond to first and second network restriction groups.

18. The method in claim 17, wherein the first and second network restriction groups are radio network access restriction groups, and wherein an access restriction restricts access to the radio network over a random access channel shared by multiple mobile radios.

19. The method in claim 18, wherein the access restriction includes whether a location registration operation is permitted for an access restriction group, whether an originating call operation is permitted for an access restriction group, whether a peak data rate is permitted for an access restriction group, whether a peak transmission power level is permitted for an access restriction group, whether a level of mobile subscriber priority is permitted for an access restriction group, or whether a level of service is permitted for an access restriction group.

20. The method in claim 15, further comprising:

determining if a page exists for one of the mobile stations in the first group;

indicating in the first message that a page message should be read by the mobile stations in the first group;

determining if a network restriction exists for a mobile station in the first group; and indicating in the first message that a network restriction exists for a mobile station in the first group.

21. The method in claim 20 wherein the indicating steps include setting one or more flags.

22. The method in claim 20, further comprising:

including in the first message a network restriction that exists for the first group.

23. The method in claim 20, further comprising:

including the network restriction in a broadcast message transmitted over a broadcast channel different than the paging channel.

24. A mobile radio station for communicating in a telecommunications system via a radio network, comprising:

a battery to provide power to the transceiver circuitry and the electronic data processing and control circuitry, transceiver circuitry configured to transmit and receive information with the radio network;

electronic data processing and control circuitry configured to determine a time when the radio network sends a message transmission over a radio channel including first and second different types of messages pertaining to the mobile station, and at that determined time to control the transceiver circuitry to receive the message transmission on the radio channel including the first and second types of messages, process the received message transmission, detect the first and second different types of messages pertaining to the mobile station, and determine whether the second message contains a network access restriction, and if not, power down to a power savings mode of operation to conserve power stored in the battery.

25. The mobile station in claim 24, wherein the message transmission is sent on a paging channel, and wherein at the determined time, the mobile station leaves the power savings mode of operation to enter an active mode of operation during which the electronic data processing and control circuitry determines from the first message if the mobile station has been paged, and if not, powers down to the power savings mode of operation to conserve power stored in the battery.

26. The mobile station in claim 25, wherein also at the determined time, the electronic data processing and control circuitry is configured to determine whether the second message contains a network access restriction, and if not, power down to the power savings mode of operation to conserve power stored in the battery.

27. The mobile station in claim 25, wherein if the electronic data processing and control circuitry determines that the second message contains a network access restriction, the electronic data processing and control circuitry is configured to process the second message further to identify the network access restriction.

28. The mobile station in claim 25, wherein the mobile station belongs to a group corresponding to one of a plurality of paging groups and the message transmission is received on a paging channel.

29. The mobile station in claim 28 wherein the group also corresponds to one of a plurality of network restriction groups.

30. The mobile station in claim 29 wherein the second message indicates whether an access restriction is in effect for the group, and the access restriction includes a restriction on a type of access to the radio network over a random access channel shared by multiple mobile radios.

31. The mobile station in claim 30, wherein the type of access includes registering from an area in the network and originating a call.

32. The mobile station in claim 29, wherein the second message includes whether a location registration operation is permitted for the one access restriction group, whether an originating call operation is permitted for the one access restriction group, what a peak data rate is permitted for the one access restriction group, or what a peak transmission power level is permitted for the one access restriction group.

33. In a telecommunications system having a plurality of mobile radio stations communicating via a radio network, a radio network, comprising:

means for determining mobile stations that belong to first and second paging groups, each paging group being associated with one of plural specified time intervals;

means for transmitting, at a first paging time interval associated with the first paging group, a first single message transmission corresponding to the first paging group including information relating to paging and one or more radio network access commands pertaining to the first group of mobile stations; and means for transmitting, at a second paging time interval associated with the second paging group, a second single message transmission corresponding to the second paging group including information relating to paging and one or more radio network access commands pertaining to the second group of mobile stations.

34. The radio network in claim 33, wherein the means for determining determines first and second radio network access restriction groups corresponding to the first and second paging groups, and wherein an access restriction restricts access to the radio network over a random access channel shared by multiple mobile radios.

35. The radio network in claim 33, further comprising:
means for determining if a page exists for one of the mobile stations in the first paging group;
means for indicating in the first message that a page message should be read by the mobile stations in the first paging group;
means for determining if a network restriction exists for a mobile station in the first group; and
means for indicating in the first message that a network restriction exists for a mobile station in the first paging group.

36. The radio network in claim 33, wherein the one or more radio network access commands directs mobile stations in the corresponding paging group to read a system broadcast message.

37. In a telecommunications system having a plurality of mobile radio stations communicating via a radio network, a method of coordinating first and second types of radio messages by providing a network message group to which a mobile station belongs so that when the mobile station receives and processes a single message transmission corresponding to that network message group, the mobile station receives in the single message both first and second types of radio messages pertinent to the mobile station.

38. The method in claim 37, wherein the message corresponding to the network message group is transmitted during a specified time interval, and wherein the mobile station leaves a power savings mode to receive the message during the specified time interval.

39. The method in claim 37, wherein the first type of radio message is a paging message.

40. The method in claim 39, wherein the second type of radio message is a radio access restriction message.

41. The method in claim 39, wherein the second type of radio message is a radio network access command.

* * * * *